United States Patent
Papasakellariou et al.

(10) Patent No.: US 10,298,367 B2
(45) Date of Patent: *May 21, 2019

(54) METHOD AND APPARATUS FOR SEQUENCE HOPPING IN SINGLE CARRIER FREQUENCY DIVISION MULTIPLE ACCESS (SC-FDMA) COMMUNICATION SYSTEMS

(71) Applicant: Samsung Electronics Co., Ltd., Gyeonggi-do (KR)

(72) Inventors: Aris Papasakellariou, Houston, TX (US); Joon-Young Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/399,396

(22) Filed: Jan. 5, 2017

(65) Prior Publication Data

US 2017/0117995 A1    Apr. 27, 2017

Related U.S. Application Data

(63) Continuation of application No. 14/827,646, filed on Aug. 17, 2015, now Pat. No. 9,572,164, which is a
(Continued)

(51) Int. Cl.
*H04L 7/00* (2006.01)
*H04L 5/00* (2006.01)
(Continued)

(52) U.S. Cl.
CPC ........ *H04L 5/0012* (2013.01); *H04J 13/0059* (2013.01); *H04J 13/0074* (2013.01);
(Continued)

(58) Field of Classification Search
CPC .. H04W 72/0466; H04J 13/22; H04L 25/4904
(Continued)

(56) References Cited

U.S. PATENT DOCUMENTS 5,881,095 A    3/1999  Cadd
5,937,002 A    8/1999  Andersson
(Continued)

FOREIGN PATENT DOCUMENTS

FR    2822316        9/2002
JP    2001514811     9/2001
(Continued)

OTHER PUBLICATIONS

NTT DoCoMo, Ericsson, Mitsubishi Electric, NEC, Sequence Hopping and Cyclic-Shift Value Hopping for Uplink Reference Signal in E-UTRA, R1-071643, 3GPP TSG RAN WG1 Meeting #48bis, Mar. 26-30, 2007.
(Continued)

*Primary Examiner* — Dmitry Levitan
(74) *Attorney, Agent, or Firm* — The Farrell Law Firm, P.C.

(57) ABSTRACT

Methods and apparatuses are provided for transmitting a signal using a sequence in a wireless communication system. A first sequence used to transmit a first signal in a first channel is determined by performing group-hopping using a pseudo-random pattern over a first group of sequences. A second sequence used to transmit a second signal in a second channel is determined by performing the group-hopping using the pseudo-random pattern over a second group of sequences.

19 Claims, 16 Drawing Sheets

Related U.S. Application Data continuation of application No. 13/861,845, filed on Apr. 12, 2013, now Pat. No. 9,113,471, which is a continuation of application No. 12/203,432, filed on Sep. 3, 2008, now Pat. No. 8,441,991.

(60) Provisional application No. 60/969,659, filed on Sep. 3, 2007.

(51) Int. Cl.
| | | |
|---|---|---|
| *H04J 13/00* | (2011.01) | |
| *H04W 72/04* | (2009.01) | |
| *H04J 13/22* | (2011.01) | |
| *H04L 25/49* | (2006.01) | |
| *H04L 27/26* | (2006.01) | |
| *H04W 84/04* | (2009.01) | |

(52) U.S. Cl.
CPC ............ *H04J 13/22* (2013.01); *H04L 5/0042* (2013.01); *H04L 25/4904* (2013.01); *H04L 27/2602* (2013.01); *H04W 72/042* (2013.01); *H04W 72/0413* (2013.01); *H04W 72/0446* (2013.01); *H04W 72/0466* (2013.01); *H04J 13/0062* (2013.01); *H04W 84/042* (2013.01)

(58) Field of Classification Search
USPC .................. 370/310, 328–330, 342, 345, 350
See application file for complete search history.

(56) References Cited

U.S. PATENT DOCUMENTS

| | | |
|---|---|---|
| 6,510,172 B1 | 1/2003 | Miller |
| 7,388,897 B2 | 6/2008 | Salmenkaita |
| 7,564,910 B2 | 7/2009 | Kostic |
| 7,653,141 B2 | 1/2010 | Mo |
| 7,724,777 B2 | 5/2010 | Sutivong |
| 7,778,151 B2 * | 8/2010 | Bertrand ............... H04J 11/005 370/208 |
| 7,852,746 B2 | 12/2010 | Jalali |
| 7,912,092 B2 | 3/2011 | Kowalski |
| 8,036,166 B2 | 10/2011 | Tiirola et al. |
| 8,432,979 B2 | 4/2013 | Tiirola et al. |
| 2002/0177447 A1 | 11/2002 | Walton et al. |
| 2002/0194555 A1 | 12/2002 | Gueguen |
| 2004/0156341 A1 | 8/2004 | Chang et al. |
| 2004/0258134 A1 | 12/2004 | Cho et al. |
| 2007/0140105 A1 | 6/2007 | Coon |
| 2007/0171889 A1 | 7/2007 | Kwon et al. |
| 2007/0183386 A1 | 8/2007 | Muharemovic et al. |
| 2007/0230600 A1 | 10/2007 | Bertrand et al. |
| 2007/0291696 A1 | 12/2007 | Zhang et al. |
| 2008/0165893 A1 | 7/2008 | Malladi et al. |
| 2008/0205375 A1 | 8/2008 | Onggosanusi et al. |
| 2008/0225785 A1 | 9/2008 | Wang et al. |
| 2008/0225791 A1 | 9/2008 | Pi et al. |
| 2008/0298433 A1 | 12/2008 | Tiirola et al. |
| 2009/0046645 A1 | 2/2009 | Bertrand et al. |
| 2010/0075760 A1 | 3/2010 | Shimabukuro et al. |
| 2010/0111142 A1 | 5/2010 | Iwai et al. |
| 2010/0210274 A1 | 8/2010 | Iwai et al. |
| 2010/0254434 A1 | 10/2010 | Iwai et al. |
| 2010/0272022 A1 * | 10/2010 | Iwai ..................... H04B 1/7143 370/328 |
| 2011/0182266 A1 | 7/2011 | Iwai et al. |

FOREIGN PATENT DOCUMENTS

| | | |
|---|---|---|
| JP | 2006325264 | 11/2006 |
| KR | 1020050085462 | 8/2005 |
| RU | 2288538 | 1/2006 |
| RU | 2290764 | 1/2006 |
| WO | WO 2006/031239 | 3/2006 |
| WO | WO 2008/111317 | 9/2008 |
| WO | WO 2008/155904 | 12/2008 |
| WO | WO 2008/155907 | 12/2008 |
| WO | WO 2009/019878 | 2/2009 |
| WO | WO 2009/057302 | 5/2009 |
| WO | WO 2009/120828 | 10/2009 |

OTHER PUBLICATIONS

Ericsson, "Uplink Reference Signals", R1-063128, TSG-RAN WG1 #47, Nov. 6-10, 2006.
Huawei, "Sequence Grouping Rule for UL DM RS", R1-073518, 3GPP TSG RAN WG1 Meeting #50, Aug. 20-24, 2007.
Texas Instruments, "Uplink Reference Signal Sequence Assignments in E-UTRA", R1-073419, 3GPP TSG RAN WG1 #50, Aug. 15, 2007.
Ericsson, "PUSCH RS", R1-073048, TSG-RAN WG1 #49bis, Jun. 25, 2007.
Motorola, E-UTRA Uplink Reference Signal Planning and Hopping Considerations, Agenda Item: 7.2.2, R1-073755, 3GPP TSG RAN1#50, Aug. 15, 2007.
NEC Group, "Assignment of Base Sequence Group for UL DM RS", R1-073453, 3GPP TSG RAN WG1 Meeting #50, Aug. 15, 2007.
Motorola, Uplink Reference Signal Planning Aspects, Agenda Item: 5.11.2, R1-072684, 3GPP TSG RAN1#49bis, Jun. 20, 2007.
Chinese Office Action dated Oct. 8, 2014 issued in counterpart application No. 201210359561.1.
Korean Office Action dated Jan. 13, 2015 issued in counterpart application No. 10-2014-7026499.
Technical Specification Group Radio Access Network; Evolved Universal Terrestrial Radio Access (E-UTRA) and Evolved Universal Terrestrial Radio Access Network (E-UTRAN); Overall Description, Stage 2, Release 8, 3rd Generation Partnership Project; 3 GPP TS 36.300 V8.1.0, Jun. 2007.

* cited by examiner

METHOD AND APPARATUS FOR SEQUENCE HOPPING IN SINGLE CARRIER FREQUENCY DIVISION MULTIPLE ACCESS (SC-FDMA) COMMUNICATION SYSTEMS

PRIORITY

This application is a Continuation Application of, and claims priority under 35 U.S.C. § 120 to, U.S. patent application Ser. No. 14/827,646, filed in the U.S. Patent and Trademark Office (USPTO) on Aug. 17, 2015, which is a Continuation Application of, and claims priority under 35 U.S.C. § 120 to, U.S. patent application Ser. No. 13/861,845, filed in the USPTO on Apr. 12, 2013, now U.S. Pat. No. 9,113,471, issued on Aug. 18, 2015, which was a Continuation Application of, and claimed priority under 35 U.S.C. § 120 to, U.S. patent application Ser. No. 12/203,432, filed in the USPTO on Sep. 3, 2008, now U.S. Pat. No. 8,441,991, issued on May 14, 2013, which claimed priority under 35 U.S.C. § 119(e) to U.S. Prov. App. No. 60/969,659 entitled "Sequence Hopping in SC-FDMA Communication Systems" filed Sep. 3, 2007, the contents of all of which are incorporated herein by reference.

BACKGROUND OF THE INVENTION

1. Field of the Invention

The present invention relates generally to wireless communication systems and, more particularly, to a Single-Carrier Frequency Division Multiple Access (SC-FDMA) communication system that is further considered in the development of the $3^{rd}$ Generation Partnership Project (3GPP) Evolved Universal Terrestrial Radio Access (E-UTRA) long term evolution (LTE).

2. Description of the Art

Methods and apparatus are considered for the functionality and implementation of hopping for sequences used in the construction of Reference Signals (RS) or control signals transmitted in SC-FDMA communication systems.

The Uplink (UL) of the communication system is assumed, which corresponds to signal transmissions from mobile User Equipments (UEs) to a serving base station (Node B). A UE, also commonly referred to as terminal or mobile station, may be fixed or mobile and may be a wireless device, a cellular phone, a personal computer device, a wireless modem card, etc. A Node B is generally a fixed station and may also be called a Base Transceiver System (BTS), an access point, or some other terminology. A Node B may control multiple cells in a cellular communication system, as it is known in the art.

Several types of signals need to be supported for the proper functionality of the communication system. In addition to data signals, which convey the information content of the communication, control signals also need to be transmitted from UEs to their serving Node B in the UL and from the serving Node B to UEs in the downlink (DL) of the communication system. The DL refers to the communication from the Node B to UEs. Additionally, a UE having data or control transmission also transmits RSs, also known as pilots. These RSs primarily serve to provide coherent demodulation for the transmitted data or control signals by a UE.

The UEs are assumed to transmit data or control signals over a Transmission Time Interval (TTI), which is assumed to correspond to a sub-frame. The sub-frame is the time unit of a frame, which may consist of ten sub-frames. FIG. 1 illustrates a block diagram of the sub-frame structure 110. The sub-frame 110 includes two slots. Each slot 120 further includes seven symbols used for transmission of data or control signals. Each symbol 130 further includes a Cyclic Prefix (CP) in order to mitigate interference due to channel propagation effects. The signal transmission in one slot may be in the same or at a different part of the operating bandwidth (BW) than the signal transmission in the second slot. In addition to symbols carrying data or control information, some symbols are used for Reference Signal (RS) transmission 140.

The transmission BW is assumed to include frequency resource units, which will be referred to herein as resource blocks (RBs). Each RB may consist of 12 sub-carriers and UEs are allocated a multiple N of consecutive RBs 150 for Physical Uplink Shared Channel (PUSCH) transmission and 1 RB for Physical Uplink Control Channel (PUCCH) transmission.

As the data or control signal transmission is over a BW that can be (orthogonally) shared by multiple UEs, the corresponding physical layer channel may be respectively referred to as PUSCH or as PUCCH. FIG. 1 illustrates a structure for the PUSCH sub-frame while respective ones for the PUCCH will be subsequently described.

The UEs are also assumed to transmit control signals in the absence of any data signals. The control signals include, but are not limited to, positive or negative acknowledgment signals (ACK or NAK, respectively) and Channel Quality Indication (CQI) signals. The ACK/NAK signals are in response to the correct or incorrect, respectively, data packet reception by a UE in the DL of the communication system. The CQI signals are sent by a UE to inform its serving Node B of its Signal-to-Interference and Noise Ratio (SINR) conditions in order for the serving Node B to perform channel dependent scheduling in the DL of the communication system. Both ACK/NAK and CQI signals are accompanied by RS signals in order to enable their coherent demodulation at the Node B receiver. The physical layer channel conveying ACK/NAK or CQI control signaling may be referred as the PUCCH.

The ACK/NAK, CQI and associated RS signals are assumed to be transmitted by UEs in one RB using CAZAC sequences as it is known in the art and is subsequently described.

FIG. 2 shows a structure for the ACK/NAK transmission during one slot 210 in a SC-FDMA communication system. The ACK/NAK information bits 220 modulate 230 a "Constant Amplitude Zero Auto-Correlation (CAZAC)" sequence 240, for example with QPSK or 16QAM modulation, which is then transmitted by the UE after performing an Inverse Fast Fourier Transform (IFFT) operation as it is further subsequently described. In addition to the ACK/NAK, RS is transmitted to enable the coherent demodulation of the ACK/NAK signal at the Node B receiver. The third, fourth, and fifth SC-FDMA symbols in each slot may carry an RS 250.

FIG. 3 shows a structure for the CQI transmission during one slot 310 in a SC-FDMA communication system. Similar to the ACK/NAK transmission, the CQI information bits 320 modulate 330 a CAZAC sequence 340, for example with QPSK or 16QAM modulation, which is then transmitted by the UE after performing the IFFT operation as it is further subsequently described. In addition to the CQI, RS is transmitted to enable the coherent demodulation at the Node B receiver of the CQI signal. In the embodiment, the second and sixth SC-FDMA symbols in each slot carry an RS 350.

As it was previously mentioned, the ACK/NAK, CQI, and RS signals are assumed to be constructed from CAZAC sequences. An example of such sequences is the Zadoff-Chu (ZC) sequences whose elements are given by Equation (1) below:

$$c_k(n) = \exp\left[\frac{j2\pi k}{L}\left(n + n\frac{n+1}{2}\right)\right]. \quad (1)$$

L is the length of the CAZAC sequence, n is the index of an element of the sequence n={0, 1, 2 . . . , L−1}, and k is the index of the sequence itself. For a given length L, there are L−1 distinct sequences, if L is prime. Therefore, the entire family of sequences is defined as k ranges in {1, 2 . . . , L−1}. However, it should be noted that the CAZAC sequences used for the ACK/NAK, CQI, and RS transmission need not be generated using the exact above expression as it is further discussed below.

For CAZAC sequences of prime length L, the number of sequences is L−1. As the RBs are assumed to consist of an even number of sub-carriers, with 1 RB consisting of 12 sub-carriers, the sequences used to transmit the ACK/NAK, CQI, and RS can be generated, in the frequency or time domain, by either truncating a longer prime length (such as length 13) CAZAC sequence or by extending a shorter prime length (such as length 11) CAZAC sequence by repeating its first element(s) at the end (cyclic extension), although the resulting sequences do not fulfill the definition of a CAZAC sequence. Alternatively, the CAZAC sequences can be directly generated through a computer search for sequences satisfying the CAZAC properties.

A block diagram for the transmission through SC-FDMA signaling of a CAZAC-based sequence in the time domain is shown in FIG. 4. The selected CAZAC-based sequence 410 is generated through one of the previously described methods (modulated by the respective bits in case of ACK/NAK or CQI transmission), it is then cyclically shifted 420 as it is subsequently described, the Discrete Fourier Transform (DFT) of the resulting sequence is obtained 430, the sub-carriers 440 corresponding to the assigned transmission bandwidth are selected 450, the Inverse Fast Fourier Transform (IFFT) is performed 460, and finally the CP 470 and filtering 480 are applied to the transmitted signal 490. Zero padding is assumed to be performed by a UE in sub-carriers used for signal transmission by another UE and in guard sub-carriers (not shown). Moreover, for brevity, additional transmitter circuitry such as digital-to-analog converter, analog filters, amplifiers, and transmitter antennas, as they are known in the art, are not shown in FIG. 4. Similarly, for the PUCCH, the modulation of a CAZAC sequence with ACK/NAK or CQI bits is well known in the art, such as for example QPSK modulation, and is omitted for brevity.

At the receiver, the inverse (complementary) transmitter functions are performed. This is conceptually illustrated in FIG. 5 where the reverse operations of those in FIG. 4 apply. As it is known in the art (not shown for brevity), an antenna receives the RF analog signal and after further processing units (such as filters, amplifiers, frequency down-converters, and analog-to-digital converters) the digital received signal 510 passes through a time windowing unit 520 and the CP is removed 530. Subsequently, the receiver unit applies an FFT 540, selects 550 the sub-carriers 560 used by the transmitter, applies an Inverse DFT (IDFT) 570, de-multiplexes (in time) the RS and CQI signal 580, and after obtaining a channel estimate based on the RS (not shown) it extracts the CQI bits 590. As for the transmitter, well known receiver functionalities such as channel estimation, demodulation, and decoding are not shown for brevity.

An alternative generation method for the transmitted CAZAC sequence is in the frequency domain. This is depicted in FIG. 6. The generation of the transmitted CAZAC sequence in the frequency domain follows the same steps as the one in the time domain with two exceptions. The frequency domain version of the CAZAC sequence is used 610 (that is the DFT of the CAZAC sequence is pre-computed and not included in the transmission chain) and the cyclic shift 650 is applied after the IFFT 640. The selection 620 of the sub-carriers 630 corresponding to the assigned transmission BW, and the application of CP 660 and filtering 670 to the transmitted signal 680, as well as other conventional functionalities (not shown), are as previously described for FIG. 4.

The reverse functions are again performed for the reception of the CAZAC-based sequence transmitted as in FIG. 6. This is illustrated in FIG. 7. The received signal 710 passes through a time windowing unit 720 and the CP is removed 730. Subsequently, the cyclic shift is restored 740, an FFT 750 is applied, and the transmitted sub-carriers 760 are selected 765. FIG. 7 also shows the subsequent correlation 770 with the replica 780 of the CAZAC-based sequence. Finally, the output 790 is obtained which can then be passed to a channel estimation unit, such as a time-frequency interpolator, in case of a RS, or can be used for detecting the transmitted information, in case the CAZAC-based sequence is modulated by ACK/NAK or CQI information bits.

The transmitted CAZAC-based sequence in FIG. 4 or FIG. 6 may not be modulated by any information (data or control) and can then serve as the RS, as shown, for example, in FIG. 2 and FIG. 3.

Different cyclic shifts of the same CAZAC sequence provide orthogonal CAZAC sequences. Therefore, different cyclic shifts of the same CAZAC sequence can be allocated to different UEs in the same RB for their RS or ACK/NAK, or CQI transmission and achieve orthogonal UE multiplexing. This principle is illustrated in FIG. 8.

Referring to FIG. 8, in order for the multiple CAZAC sequences 810, 830, 850, 870 generated correspondingly from multiple cyclic shifts 820, 840, 860, 880 of the same root CAZAC sequence to be orthogonal, the cyclic shift value Δ890 should exceed the channel propagation delay spread D (including a time uncertainty error and filter spillover effects). If $T_S$ is the duration of one symbol, the number of cyclic shifts is equal to the mathematical floor of the ratio $T_S/D$. For a CAZAC sequence of length 12, the number of possible cyclic shifts is 12 and for symbol duration of about 66 microseconds (14 symbols in a 1 millisecond sub-frame), the time separation of consecutive cyclic shifts is about 5.5 microseconds. Alternatively, to provide better protection against multipath propagation, only every other (6 of the 12) cyclic shift may be used providing time separation of about 11 microseconds.

CAZAC-based sequences of the same length typically have good cross-correlation properties (low cross-correlation values), which is important in order to minimize the impact of mutual interference in synchronous communication system and improve their reception performance. It is well known that ZC sequences of length L have optimal cross-correlation of $\sqrt{L}$. However, this property does not hold when truncation or extension is applied to ZC sequences or when CAZAC-based sequences are generated through computer search. Moreover, CAZAC-based sequences of different lengths have a wide distribution of cross-correlation values and large values can frequently occur leading to increased interference.

FIG. 9 illustrates the Cumulative Density Function (CDF) of cross-correlation values for length-12 CAZAC-based sequence resulting from cyclically extending a length-11 ZC sequence, truncating a length-13 ZC sequence and generating length-12 CAZAC-based sequences through a computer search method. Variations in cross-correlation values can be easily observed. These variations have even wider distribution for cross-correlations between CAZAC-based sequences with different lengths.

The impact of large cross-correlations on the reception reliability of signals constructed from CAZAC-based sequences can be mitigated through sequence hopping. Pseudo-random hopping patterns are well known in the art and are used for a variety of applications. Any such generic pseudo-random hopping pattern can serve as a reference for sequence hopping. In this manner, the CAZAC-based sequence used between consecutive transmissions of ACK/NAK, CQI, or RS signals in different SC-FDMA symbols, can change in a pseudo-random pattern and this reduces the probability that CAZAC-based generated signals will be subjected to large mutual cross-correlations and correspondingly experience large interference over their transmission symbols.

There is therefore a need for supporting hopping of CAZAC-based sequences with minimum implementation complexity in order to reduce the average interference among CAZAC-based sequences.

There is another need for assigning CAZAC-based sequences through planning in different Node Bs and different cells of the same Node B in a communication system.

Finally, there is a need for minimizing the signaling overhead for communicating sequence hopping parameters or the sequence assignment (planning) from the serving Node B to the UEs.

SUMMARY OF THE INVENTION

The present invention has been made to address at least the above-mentioned problems and/or disadvantages and to provide at least the advantages described below. Accordingly, an aspect of the present invention provides an apparatus and method for supporting CAZAC-based sequence hopping or sequence planning.

Another aspect of the present invention enables CAZAC-based sequence hopping with minimum implementation complexity at a UE transmitter and a Node B receiver by applying the same hopping pattern to the sequences used for signal transmission in all possible channels.

Additionally, an aspect of the present invention enables CAZAC-based sequence hopping with minimum implementation complexity at a UE transmitter and a Node B receiver by limiting the total number of sequences in the sets of sequences for the possible resource block allocations to be equal to the smallest number of sequences obtained for one of the possible resource block allocations.

A further aspect of the present invention enables CAZAC-based sequence hopping and planning with minimum signaling overhead for communicating the sequence allocation parameters from the serving Node B to UEs.

According to one aspect of the present invention, a method is provided for transmitting a signal using a sequence in a wireless communication system. A first sequence used to transmit a first signal in a first channel is determined by performing group-hopping using a pseudo-random pattern over a first group of sequences. A second sequence used to transmit a second signal in a second channel is determined by performing the group-hopping using the pseudo-random pattern over a second group of sequences.

According to another aspect of the present invention, an apparatus is provided for transmitting a signal using a sequence in a wireless communication system. The apparatus includes a transmitter configured to a signal over a network. The apparatus also includes a controller configured to determine a first sequence used to transmit a first signal in a first channel by performing group-hopping using a pseudo-random pattern over a second group of sequences, and determine a second sequence used to transmit a second signal in a second channel by performing the group-hopping using the pseudo-random pattern over a second group of sequences.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF THE EMBODIMENTS

Figure 1:
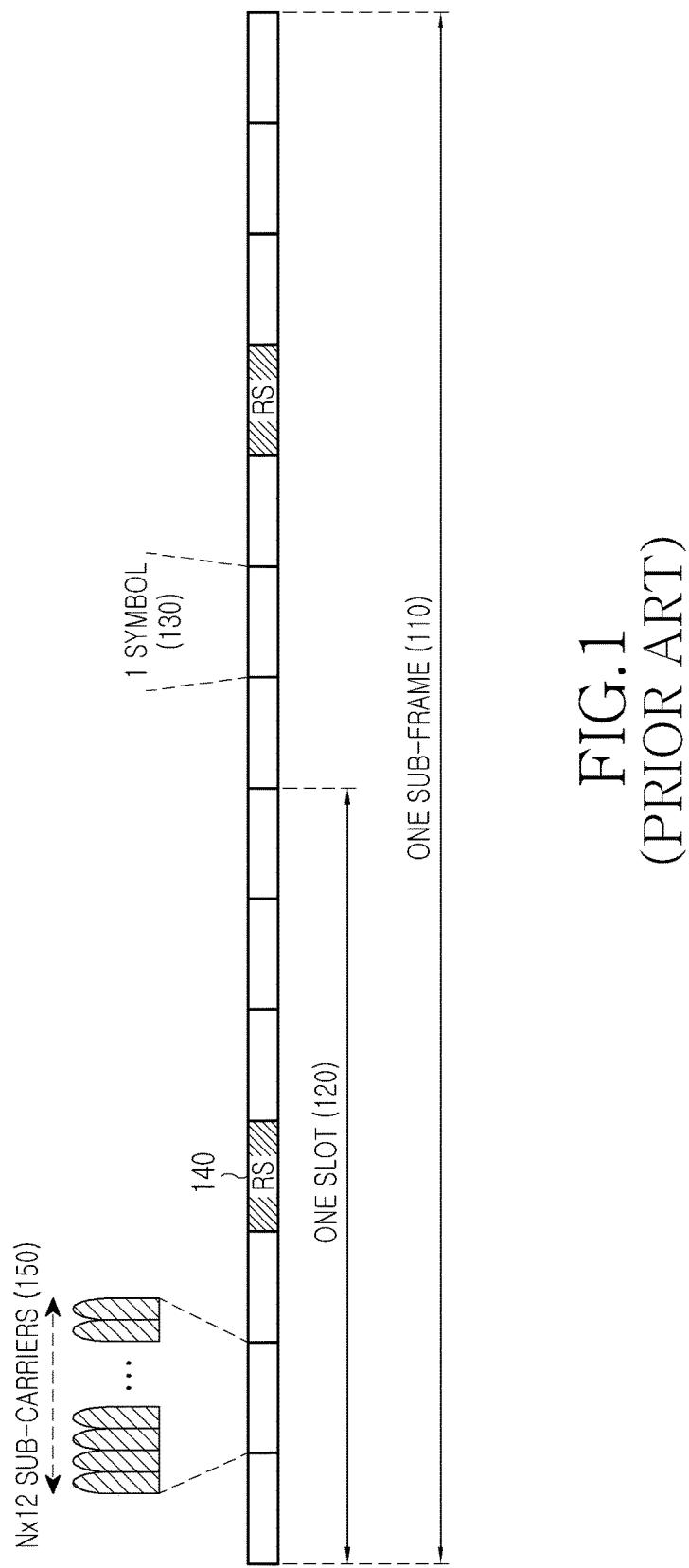
FIG. 1 is a diagram illustrating a sub-frame structure for the SC-FDMA communication system.
Figure 2:
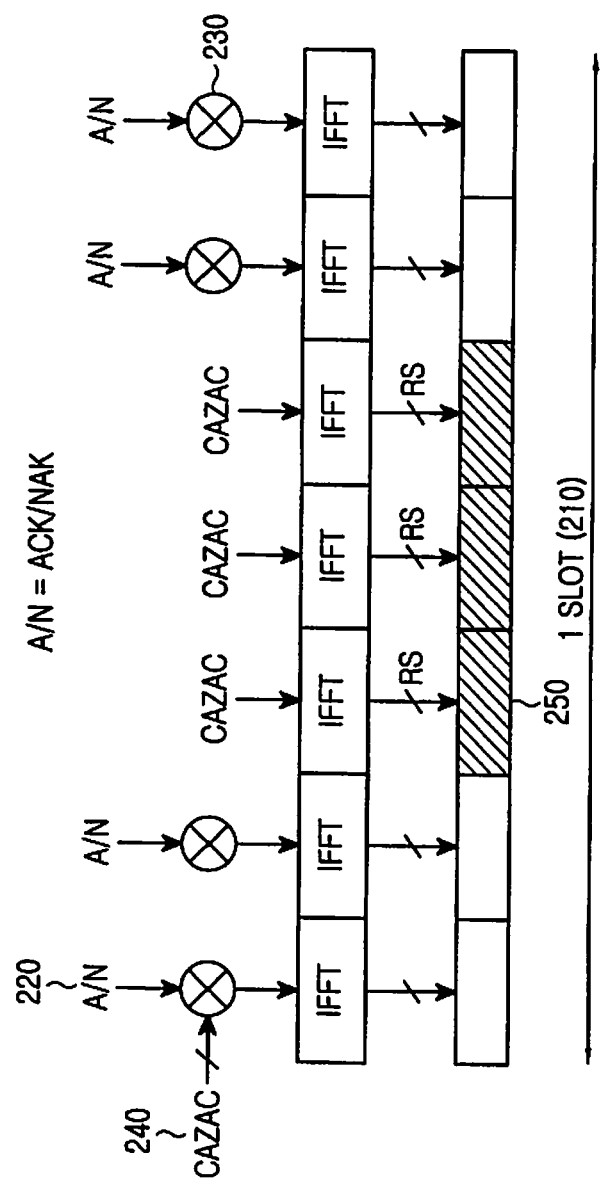
FIG. 2 is a diagram illustrating a partitioning of a slot structure for the transmission of ACK/NAK bits.
Figure 3:
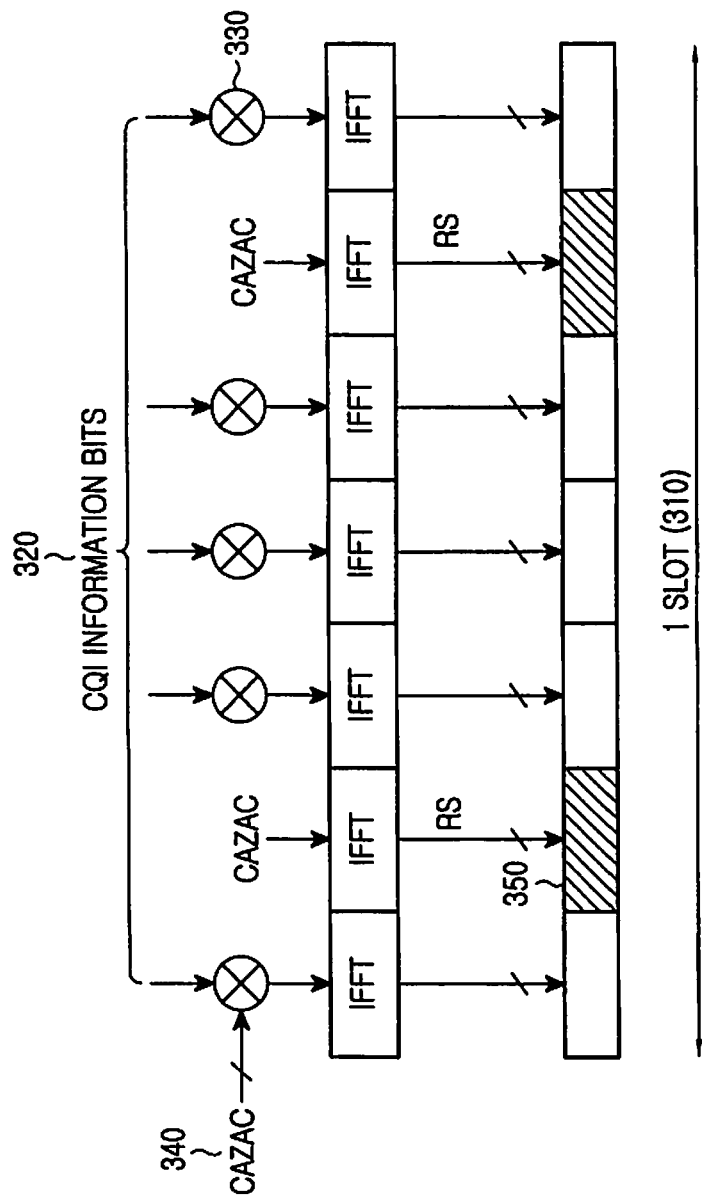
FIG. 3 is a diagram illustrating a partitioning of a slot structure for the transmission of CQI bits.
Figure 4:
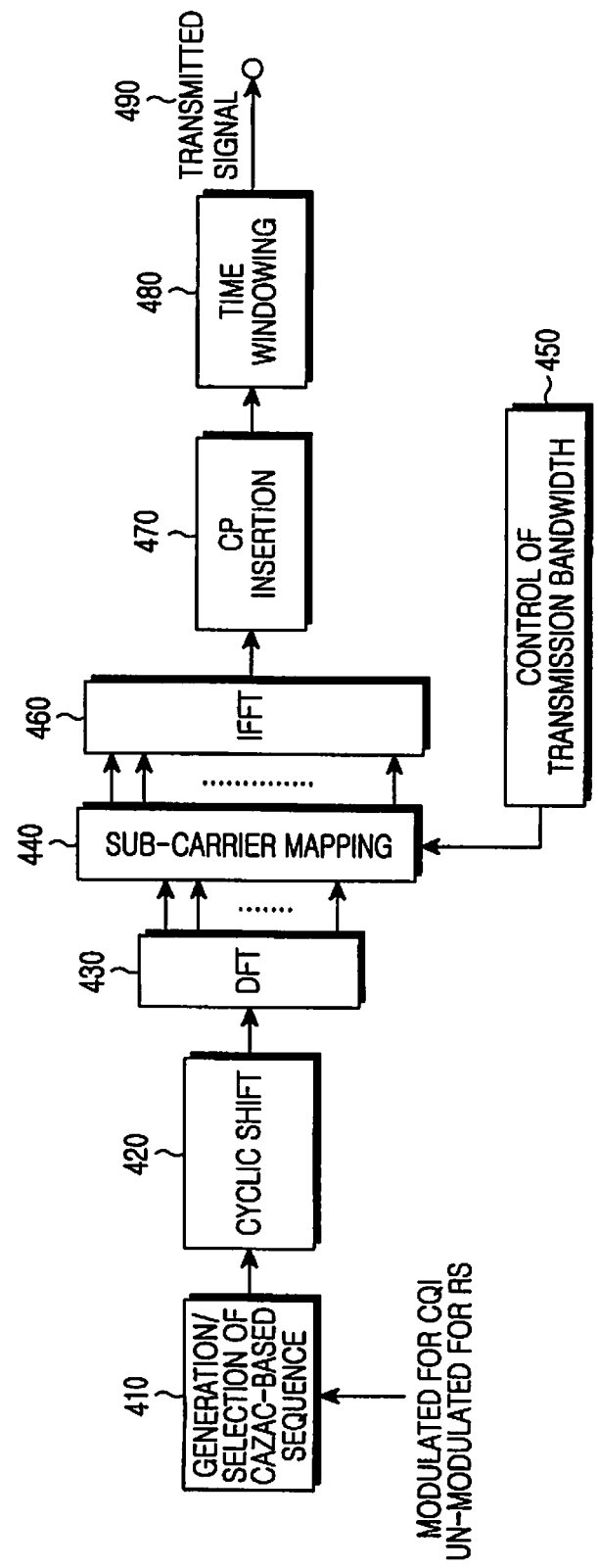
FIG. 4 is a block diagram illustrating an SC-FDMA transmitter for transmitting an ACK/NAK signal, or a CQI signal, or a reference signal using a CAZAC-based sequence in the time domain.
Figure 5:
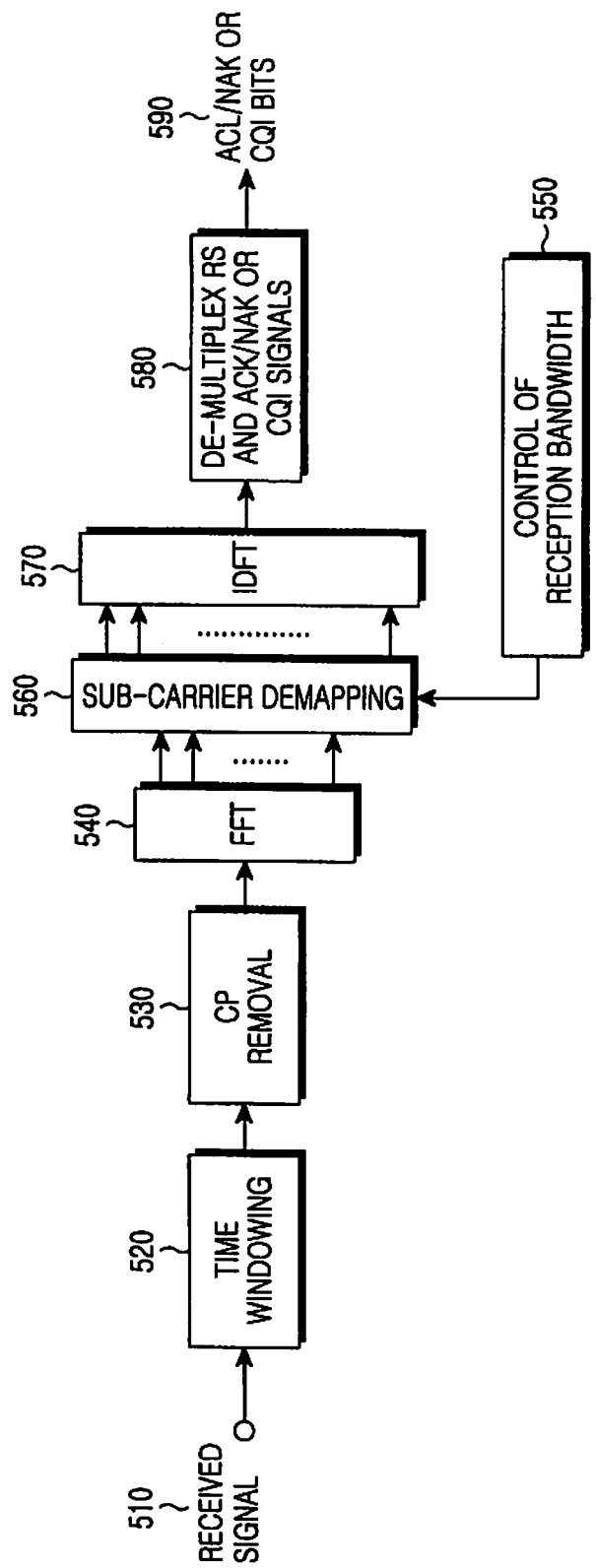
FIG. 5 is a block diagram illustrating an SC-FDMA receiver for receiving an ACK/NAK signal, or a CQI signal, or a reference signal using a CAZAC-based sequence in the time domain.
Figure 6:
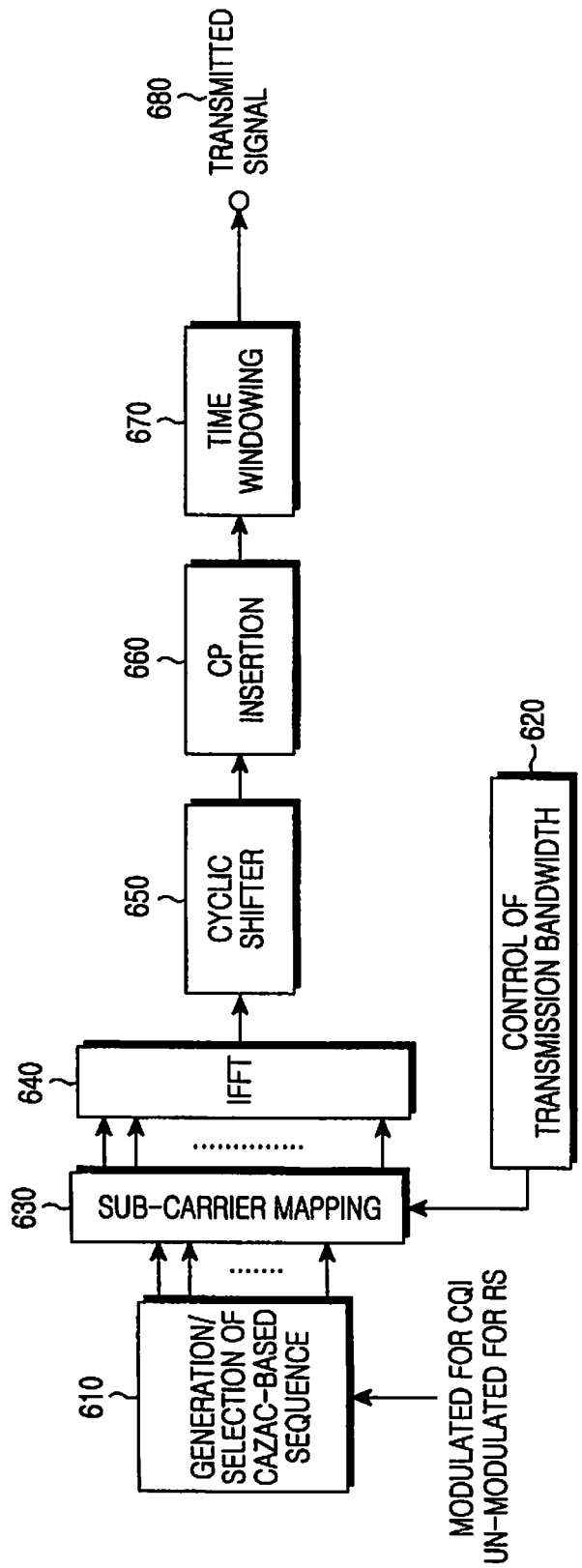
FIG. 6 is a block diagram illustrating an SC-FDMA transmitter for transmitting an ACK/NAK signal, or a CQI signal, or a reference signal using a CAZAC-based sequence in the frequency domain.
Figure 7:
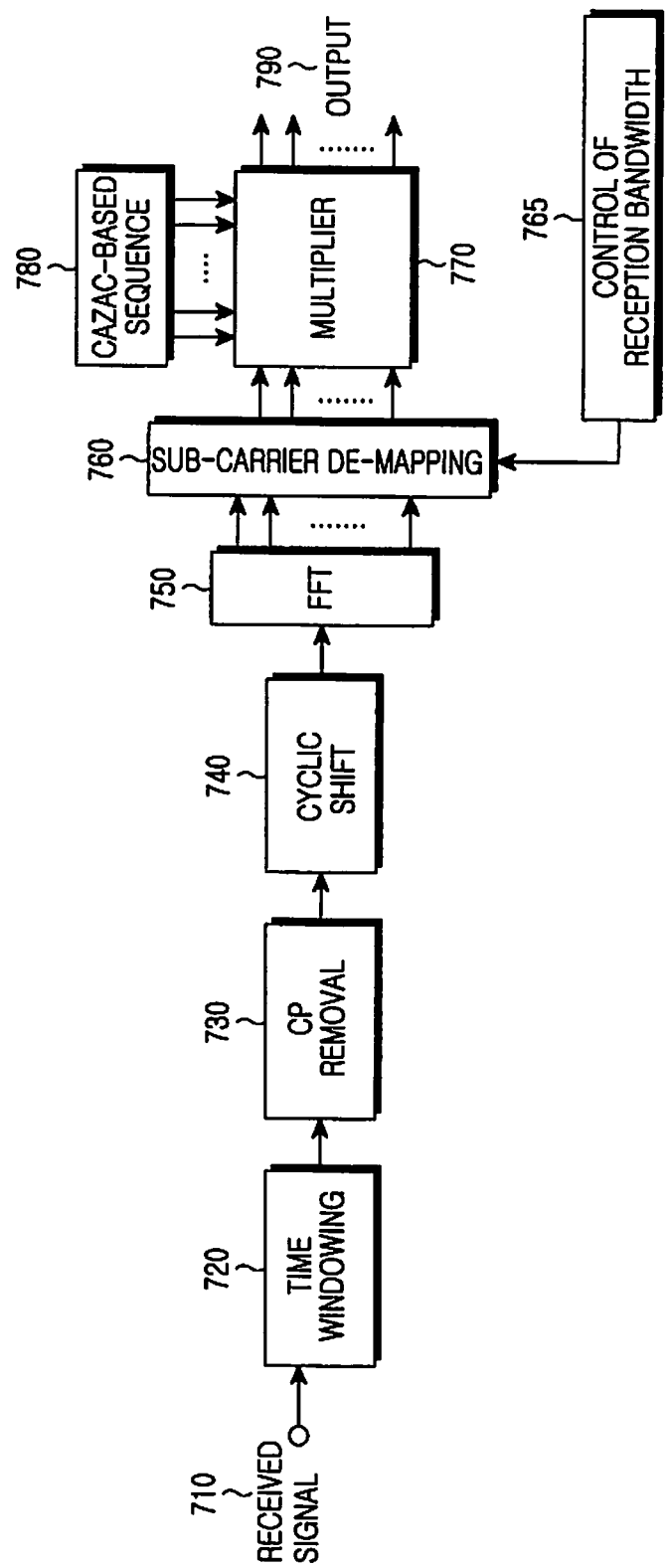
FIG. 7 is a block diagram illustrating an SC-FDMA receiver for receiving an ACK/NAK signal, or a CQI signal, or a reference signal using a CAZAC-based sequence in the frequency domain.
Figure 8:
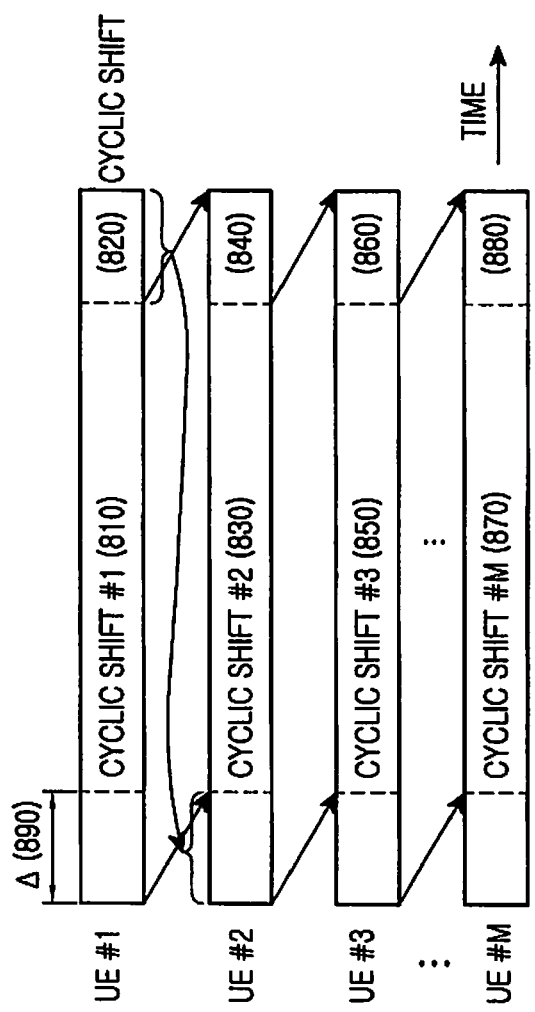
FIG. 8 is a block diagram illustrating a construction of orthogonal CAZAC-based sequences through the application of different cyclic shifts on a root CAZAC-based sequence.
Figure 9:
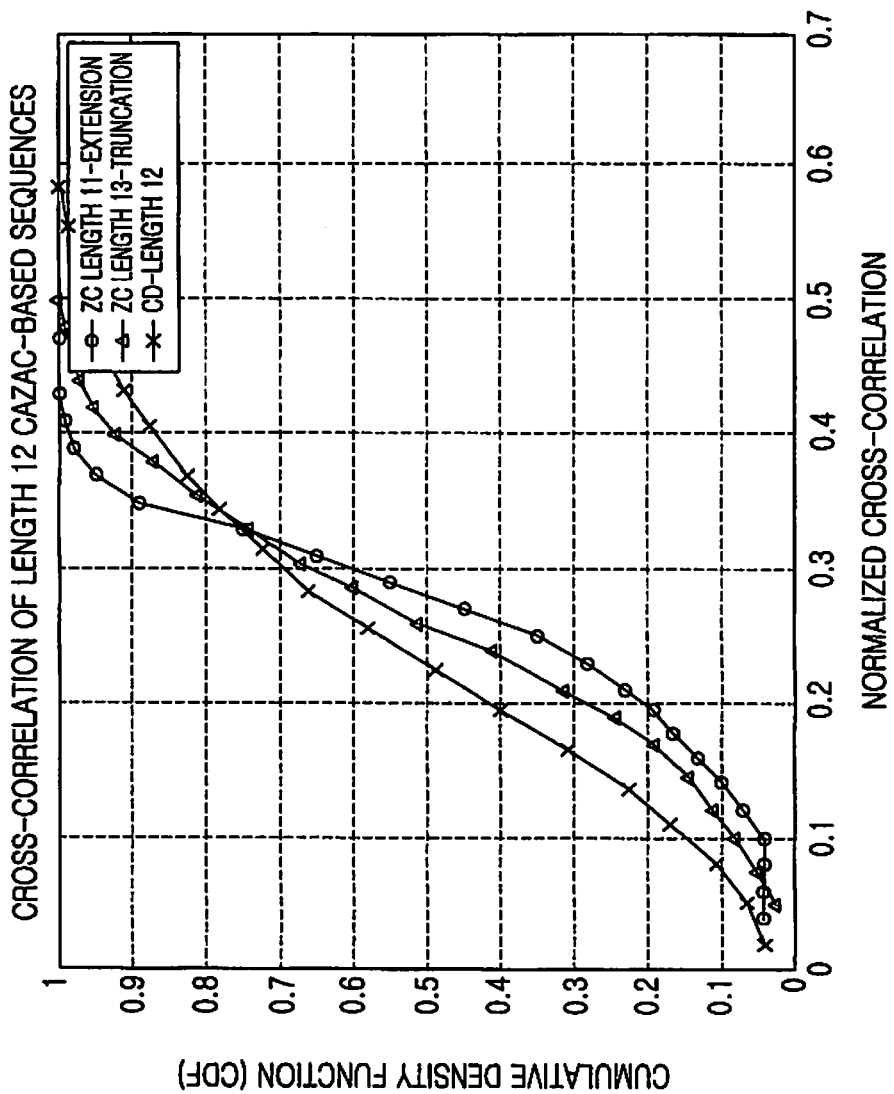
FIG. 9 is a diagram illustrating the CDF of cross-correlation values for CAZAC-based sequences of length 12.

Embodiments of the present invention are described in detail with reference to the accompanying drawings. The same or similar components are designated by the same or similar reference numerals although they are illustrated in different drawings. Detailed descriptions of constructions or processes known in the art may be omitted to avoid obscuring the subject matter of the present invention.

Additionally, although the present invention assumes a SC-FDMA communication system, it also applies to all Frequency Division Multiplexing (FDM) systems in general and to Orthogonal Frequency Division Multiple Access (OFDMA), Orthogonal Frequency Division Multiplexing (OFDM), Frequency Division Multiple Access (FDMA), Discrete Fourier Transform (DFT)-spread OFDM, DFT-spread OFDMA, Single-Carrier OFDMA (SC-OFDMA), and Single-Carrier OFDM in particular.

Methods of the embodiments of the invention solve problems related to the need for enabling sequence planning or sequence hopping for CAZAC-based sequences while minimizing the respective implementation complexity at a UE transmitter and at a Node B receiver and minimizing the signaling overhead required for configuring the sequence planning or the sequence hopping patterns.

As discussed in the foregoing background, the construction of CAZAC-based sequences may be through various methods. The number of sequences provided with cyclic extension or truncation of Zadoff-Chu (ZC) sequences depends on the sequence length. Some indicative values for corresponding RB allocations are shown in Table 1 where one RB is assumed to consist of 12 sub-carriers.

TABLE 1

Number of CAZAC-based Sequences from Cyclic Extension of ZC Sequences

| Number of RBs | Number of Sub-Carriers | Number of Sequences from ZC Extension |
|---|---|---|
| 1 | 12 | 10 (prime is 11) |
| 2 | 24 | 22 (prime is 23) |
| 3 | 36 | 30 (prime is 31) |
| 4 | 48 | 46 (prime is 47) |
| 5 | 60 | 58 (prime is 59) |
| 6 | 72 | 70 (prime is 71) |
| 8 | 96 | 88 (prime is 89) |
| 9 | 108 | 106 (prime is 107) |
| 10 | 120 | 112 (prime is 113) |

Since the number of CAZAC-based sequences depend on the corresponding sequence length, a number of sequences of larger length can be associated with each sequence of smaller length. For example, referring to Table 1, for cyclic extension of ZC sequences, each of the 10 sequences of length 12 can be associated (one-to-one mapping) with a set of 7 sequences of length 72 (since there are 70 sequences of length 72). Moreover, the number of sequences for small RB allocations, such as 1 RB or 2 RBs, is the smallest and defines the constraints in allocating different sequences in neighboring cells and Node Bs (a Node B may comprise of multiple cells). For these sequences, if a pseudo-random hopping pattern applies for their transmission, the same sequence may often be used in neighboring cells resulting to full interference of transmissions and associated degradation in the reception reliability of signals transmitted through the use of CAZAC-based sequences.

To mitigate the sequence allocation problem resulting from the small number of available CAZAC-based sequences for the smaller RB allocations, CAZAC sequences constructed through computer searches can be used as a larger number of sequences can be obtained in this manner. However, unlike CAZAC-based sequences obtained from cyclic extension or truncation of ZC sequences, a closed form expression for computer generated CAZAC sequences does not exist and such sequences need to be stored in memory. For this reason, their use is typically confined to small RB allocations where the shortage of CAZAC-based sequences is most acute. For the larger RB allocations, CAZAC-based sequences are generated through the implementation of a formula such as the one described for the generation of ZC sequences. About 30 computer generated CAZAC sequences can be obtained for 1 RB allocations and by obtaining the same number of sequences for 2 RB allocations, sequence planning and sequence hopping is then constrained by the number of sequences for 1, 2, or 3 RB allocations. In an embodiment this number is 30.

The invention considers cyclic extension of ZC sequences for the generation of CAZAC-based sequences for allocations equal to or larger than 3 RBs and computer generated CAZAC sequences for allocations of 1 RB or 2 RBs.

An embodiment of the invention assumes that PUCCH transmissions from a UE occupy one RB and allocations larger than 1 RB are used only for the PUSCH, which, in the embodiment, contains 2 RS transmission symbols per sub-frame. Therefore, only one sequence hopping opportunity exists within a PUSCH sub-frame.

For packet retransmissions based on Hybrid Automatic Repeat reQuest (HARQ), as it is known in the art, the interference experienced by the CAZAC-based sequence used for RS transmission will be different among retransmissions as different RB allocations (different size or different BW position leading to partial overlapping between two CAZAC sequences) are likely to be used for UEs in interfering cells during a packet retransmission. Moreover, the channel characteristics are likely to be different between retransmissions and this also leads to different cross-correlation characteristics among interfering CAZAC sequences. Therefore, extending the number of sequences for each RB allocation to more than 2 is of little or no benefit to the PUSCH reception quality.

For the above reasons, the invention considers the use of only a sub-set of sequences from the total set of available ones. These sequences may be fixed and selected according to their cross-correlation and/or according to their cubic metric values where small values are desired in both cases. Limiting the number of sequences that can be used for hopping for the larger RB allocations, reduces the number of sequence groups and corresponding hopping patterns that need to be supported and therefore reduces the complexity and signaling overhead to support sequence hopping.

Considering that the limitation of sequences, and therefore the limitation in hopping patterns, occurs for the smaller RB allocations and that an embodiment of the invention assumes 2 RS per PUSCH sub-frame, one sequence for small RB allocations can be associated with two sequences for the larger RB allocations. As the embodiment assumes 30 computer generated CAZAC sequences for 1 RB and 2 RB allocations, the grouping of sequences for different RB allocations results in 30 groups where each group includes one CAZAC-based sequence for allocations up to 5 RBs and two CAZAC sequences for allocations larger than 5 RBs (Table 1). The sequences in each group are different.

The grouping principle is summarized in Table 2. In an embodiment of the present invention, there are 30 sequence groups (one-to-one mapping is assumed between each sequence group and each sequence in a set of 30 sequences). Considering the number of available sequences from Table 1, it becomes apparent that only a sub-set of sequences is used for allocations of 4 RBs (30 out of set of 46 sequences are used), 5 RBs (30 out of set of 58 sequences are used), and 6 RBs or larger (60 out of a set of 70 or more sequences are used). As previously mentioned, the sub-set of these sequences may be fixed and selected for its cross-correlation and/or cubic metric properties. Therefore, the number of sequence groups is equal to the smallest sequence set size, which in the embodiment is equal to 30, with each group containing one sequence for allocations up to 5 RBs and two sequences for allocations larger than 5 RBs, and each set containing 30 sequences for allocations smaller than or equal to 5 RBs and 60 sequences for allocations larger than 5 RBs.

TABLE 2

Number of Sequences per Sequence Group.

| Number of RBs | Number of Sequences per group |
|---|---|
| 1 | 1 |
| 2 | 1 |
| 3 | 1 |
| 4 | 1 |
| 5 | 1 |
| 6 | 2 |
| 8 | 2 |
| 9 | 2 |
| 10 or larger | 2 |

The invention considers that the CAZAC sequence allocation to cells or Node Bs is either through planning or hopping. If both sequence planning and sequence hopping could supported in a communication system, the UEs are informed of the selection for planning or hopping through a respective indicator broadcasted by the Node B (one bit is needed to indicate whether sequence planning or sequence hopping is used).

Sequence planning assigns each of the 30 groups of sequences, with each group containing 1 sequence for allocations up to 5 RBs and 2 sequences for allocations larger than 5 RBs, to neighboring cells and Node Bs so that the geographical separation between cells using the same group of sequences is preferably maximized. The assignment may be explicit through broadcasting of group sequence number, which in an embodiment having 30 sequence groups can be communicated through the broadcasting of 5 bits, or it can be implicit by associating the group sequence number to the cell identity. This is equivalent to specifying one sequence from the set of sequences with the smallest size (because a one-to-one mapping between each of these sequences and each group of sequences is assumed). In the embodiment this can be either of the sets of 30 sequences corresponding to 1, 2, or 3 RB allocations.

Figure 10:
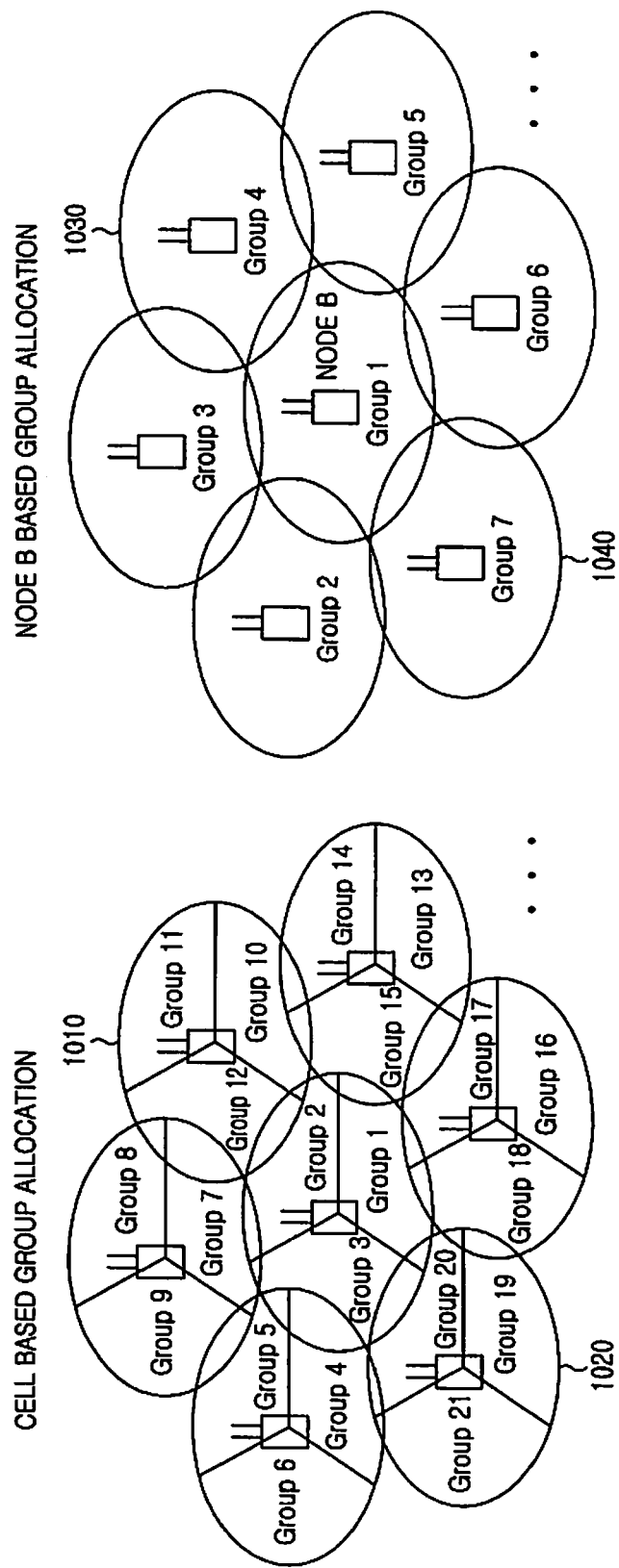
FIG. 10 is a diagram illustrating the allocation of sequence groups to different cells or different Node Bs through group sequence planning, according to an embodiment of the present invention.

This principle is illustrated in FIG. 10 for cell based and Node B based sequence group allocation (a Node B is assumed to serve 3 cells). For cell based sequence group assignment, different cells, such as, for example cells 1010 and 1020, are assumed to be allocated different sequence groups. For Node B based sequence group assignment, different cells, such as, for example Node Bs 1030 and 1040, are assumed to be allocated different sequence groups. Obviously, after exhausting all sequence groups, having the same sequence group in cells or Node Bs cannot be avoided but the objective is to have large geographical separation among such cells or Node Bs so that the interference caused from using the same sequences is negligible.

Figure 11:
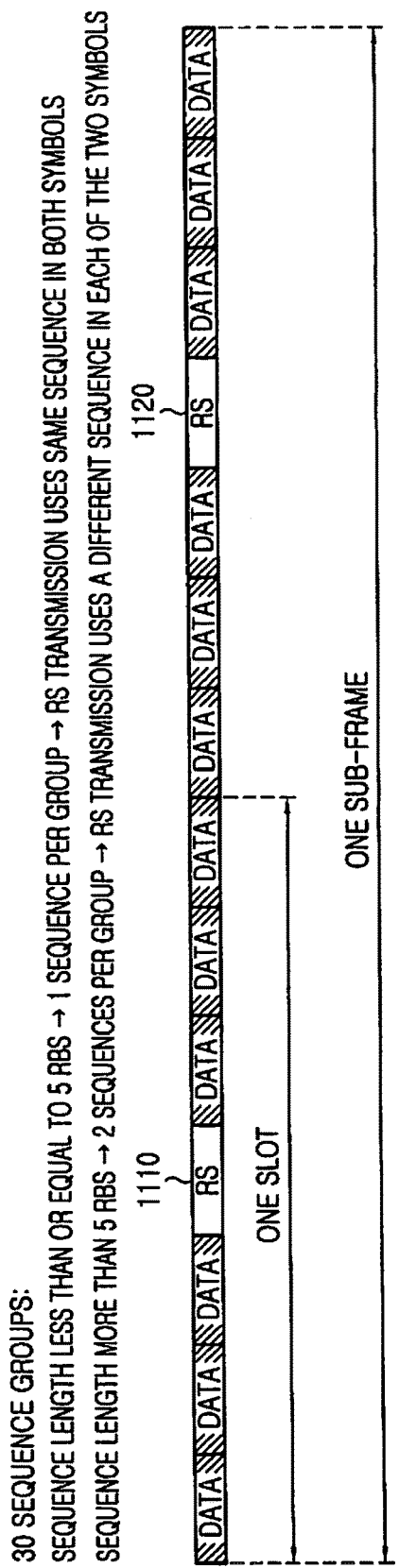
FIG. 11 is a diagram illustrating sequence hopping within a sub-frame for allocation larger than 6 RBs when group sequence planning is used, according to an embodiment of the present invention.

Sequence hopping may still apply between the pair of sequences for allocations of 6 RBs or larger during the two RS transmission symbols of the PUSCH sub-frame as illustrated in FIG. 11. This provides additional randomization of the cross-correlations among sequences transmitted from UEs in different cells and thereby provides more robust reception reliability than the one achieved purely through sequence planning. No hopping applies for the sequences with length smaller than 6 RBs assuming that all sequence groups are used for planning. Therefore, if the PUSCH allocation to a UE is smaller than 6 RBs, the same CAZAC sequence is used for the RS transmission symbols 1110 and 1120 while if the PUSCH allocation is 6 RBs or larger, a different CAZAC sequence, among 2 possible CAZAC sequences, is used for the RS transmission in each of the symbols 1110 and 1120.

Figure 12:
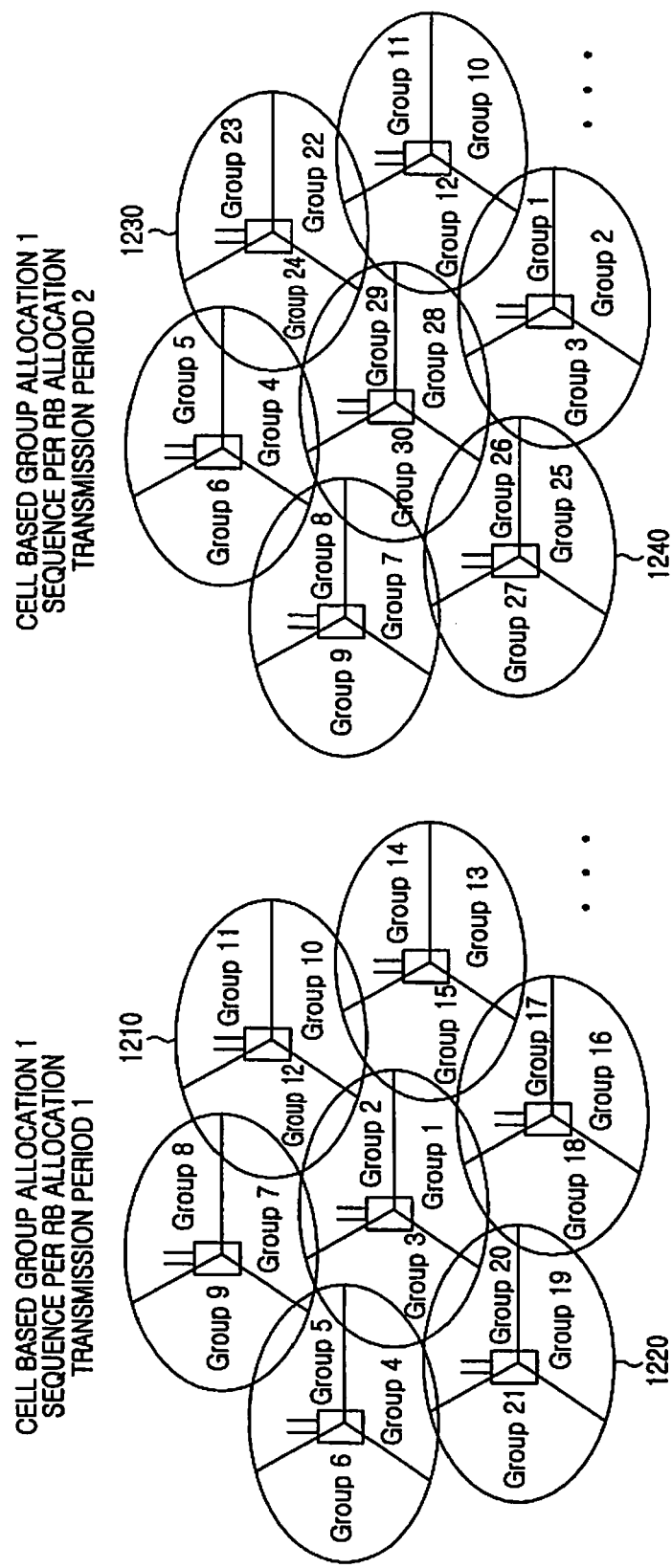
FIG. 12 is a diagram illustrating the allocation of sequence groups to different cells or different Node Bs through group sequence hopping, according to an embodiment of the present invention.
Figure 13:
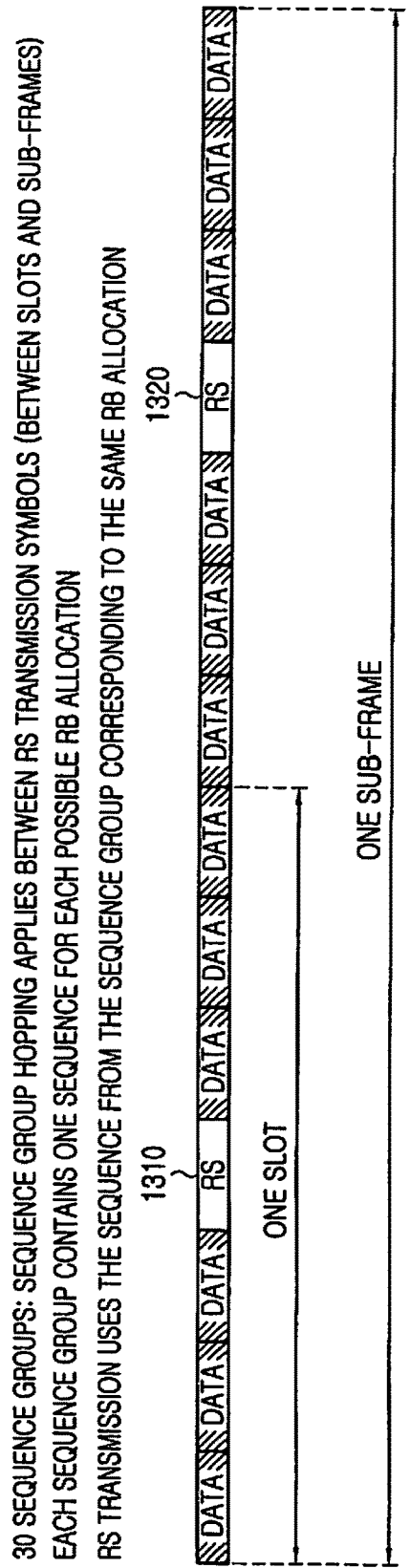
FIG. 13 is a diagram illustrating sequence hopping within a sub-frame when group sequence hopping is used, according to an embodiment of the present invention.

If sequence planning is not used, the invention assumes that sequence hopping applies instead for the sequences used for RS transmission between successive transmission instances for any possible RB allocation. The RS transmission in the two symbols of the PUSCH sub-frame in FIG. 1 is based on sequences from two typically different groups of sequences. However, in order to limit the complexity and signaling required to define the sequence hopping patterns and since there is no additional benefit from having more than one sequence per group for allocations larger than 5 RBs when sequence hopping is used, only one sequence for each RB allocation exists for any of the 30 groups of sequences. In other words, only one sequence is selected to be used for each of the possible RB allocations (all entries in Table 2 contain 1 sequence) and all sets of sequences contain the same number of sequences, which is the same as the number of sequence groups. FIG. 12 and FIG. 13 further illustrate this concept. In FIG. 12, different sequence groups such as 1210 and 1230 or 1220 and 1240 are used during different transmission periods in each cell.

In FIG. 13, the sequence used by a UE during successive RS transmissions 1310 and 1320 varies according to a sequence hopping pattern which is initialized either explicitly through broadcast signaling in each cell or implicitly through the broadcasted cell identity. The sequence hopping pattern may be the same for all cells and only its initialization may be cell dependent by specifying the initial sequence group or, equivalently, by specifying the initial sequence for an RB allocation since one-to-one mapping between each sequence in a set and each sequence group is assumed. The first transmission period may correspond to the first slot of the first sub-frame in a period of one frame (for example, a frame may comprise of 10 sub-frames) or to any other predetermined transmission instance. The same concept can be trivially extended to Node B specific sequence hopping.

Sequence hopping for both PUCCH signals (ACK/NAK, CQI, and RS) and the PUSCH RS can also be supported and the respective signaling is subsequently considered.

In order to maximize the PUCCH UE multiplexing capacity, all cyclic shifts (CS) of a CAZAC sequence are assumed to be used for the PUCCH transmission within a cell thereby necessitating the use of different CAZAC sequences in different cells (FIG. 10 with cell based group allocation). However, for the PUSCH, this depends on the extent of the application of Spatial Domain Multiple Access (SDMA) as it is known in the art. With SDMA, multiple UEs share the same RBs for their PUSCH transmission (no SDMA applies for the PUCCH as all CS are assumed to be used in each cell).

Figure 14:
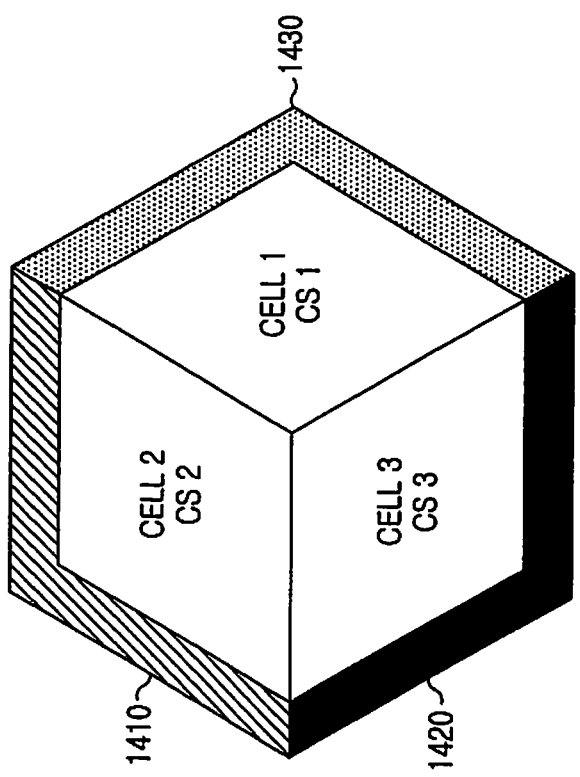
FIG. 14 is a diagram illustrating allocating different sequences with different cyclic shifts to cells of the same Node B, according to an embodiment of the present invention.

Without SDMA or with SDMA applied to a maximum of 4 UEs per cell, assuming that 12 CS can be used, the same CAZAC sequence may be used among the adjacent cells of the same Node B with different CS used to discriminate the PUSCH RS in each cell as shown in FIG. 14 which is combined with FIG. 10 for the case of Node B based sequence group allocation. Cells 1410, 1420, and 1430 use the same sequence group, that is the same CAZAC-based sequence for any given PUSCH RB allocation, but use different CS in order to separate the sequences.

With SDMA applied to more than 4 UEs per cell (with 3 cells per Node B), it may not be possible to rely on the use of different CS to separate the PUSCH RS from UEs in different cells. Then, a different CAZAC-based sequence needs to be used per cell as is the case for the PUCCH (FIG. 10 with cell based group allocation). Regardless of the separation method for the PUSCH RS from UEs in different cells of a Node B (through different CS of the same CAZAC-based sequence or through different CAZAC-based sequences), the present invention considers that the sequence hopping pattern for the PUCCH is derived from the signaled sequence hopping pattern for the PUSCH (the reverse may also apply).

Figure 15:
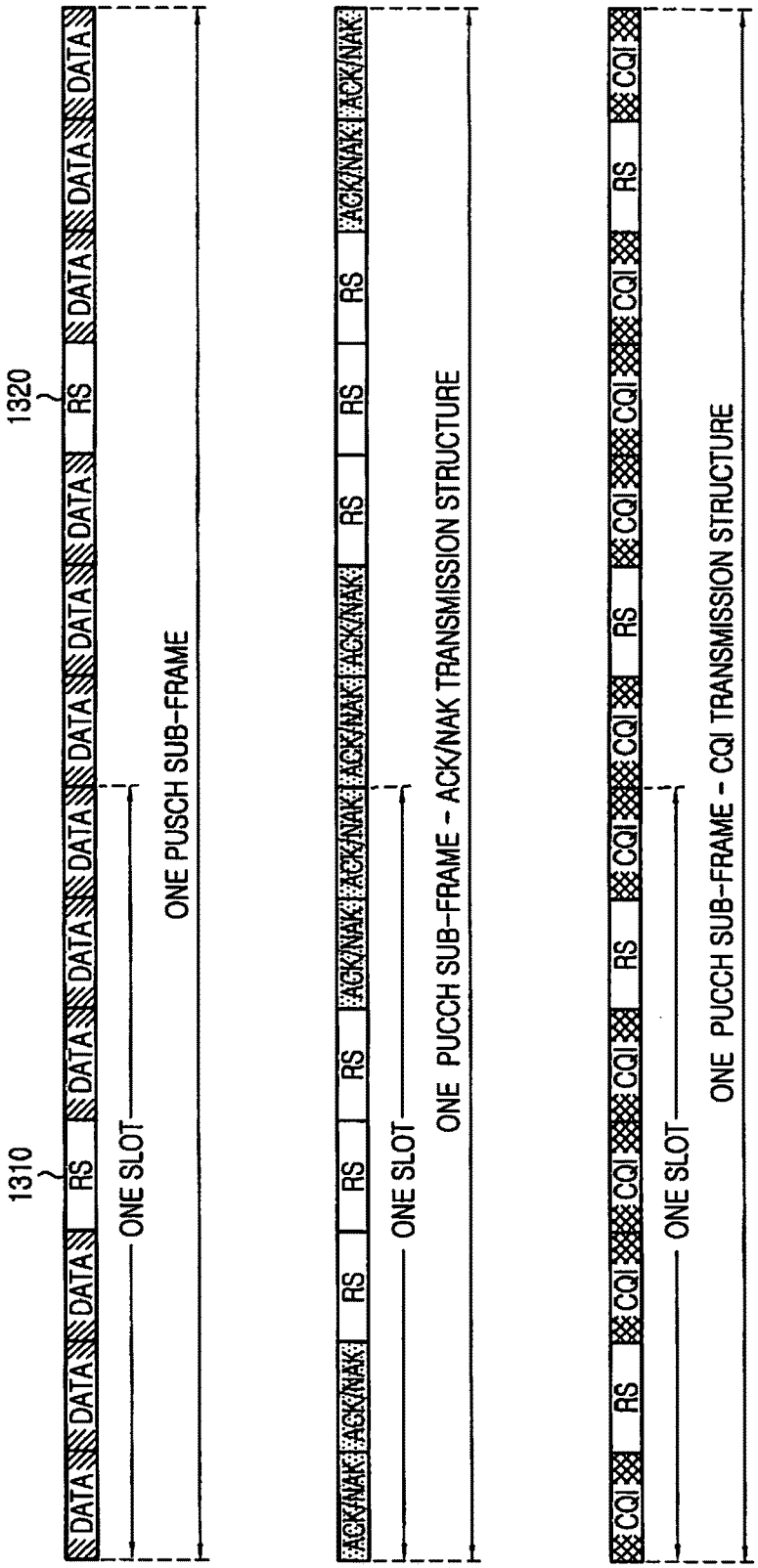
FIG. 15 is a diagram illustrating determining the PUCCH sequence from the PUSCH sequence, according to an embodiment of the present invention.

If different CAZAC-based sequences are used for the PUSCH RS transmission in the cells of a Node B (FIG. 10 with cell based group allocation), for example through sequence planning, the invention considers that the same CAZAC sequence can be used for 1 RB allocations of the PUSCH RS and for the PUCCH (for which the signal transmissions are assumed to be always over 1 RB). Therefore, the initial sequence group assignment for the PUSCH, either through explicit signaling in a broadcast channel in the serving cell or through implicit mapping to the broadcasted cell identity, determines the sequence used for the PUCCH transmission. This concept is illustrated in FIG. 15.

It should be noted that PUCCH signals (RS and/or ACK/NAK and/or CQI) may allow for more sequence hopping instances within a sub-frame (symbol-based sequence hopping), but the same hopping pattern can still apply as it only needs to have a longer time scale for the PUSCH RS. If the sequence hopping for PUCCH signals is slot based and not symbol based, the PUSCH and PUCCH use the same sequence hopping patterns.

If the same CAZAC sequence is used for the PUSCH RS transmission in different cells of the same Node B (FIG. 10 with Node B based sequence group allocation), the sequence hopping pattern for the PUCCH transmission may still be determined by the sequence hopping pattern of the PUSCH RS transmission even though different CAZAC sequences are used in each cell of the same Node B for the PUCCH transmission. This is achieved by the Node B signaling only a shift of the initial sequence applied to the PUSCH RS transmission, with this shift corresponding to initializing the sequence hopping pattern with a different CAZAC sequence in the set of CAZAC sequences over 1 RB for the PUCCH. Clearly, as it is subsequently illustrated in FIG. 16, the addition of a shift value S is cyclical over the set of sequences, meaning that the shift value S is applied modulo the size of the sequence set K, wherein the modulo operation is as known in the art. Therefore, in mathematical terms, if the hopping pattern for the PUSCH is initialized with sequence number N, the hopping pattern for the PUCCH is initialized, in the respective sequence set, with sequence number $M=(N+S) \bmod(K)$ where $(N+S)\bmod(K)=(N+S)-\mathrm{floor}((N+S)/K)$. K and the "floor" operation rounds a number to its lower integer as it is known in the art.

The shift can be specified by a number of bits equal to the number of sequences for the RB allocation of PUCCH signals. If the PUCCH RB allocation is the smallest one corresponding to 1 RB, this number is identical to the number of sequence groups (in the embodiment, 5 bits are needed to specify one of the 30 sequences in a set of sequences or, equivalently, one of the 30 sequence groups). Alternatively, such signaling overhead can be reduced by limiting the range of the shift to only the sequences with indexes adjacent to the ones used for the by the first sequence in the hopping pattern applied to the RS transmission for the data channel. In that case, only 2 bits are needed to indicate the previous, same, or next sequence.

Figure 16:
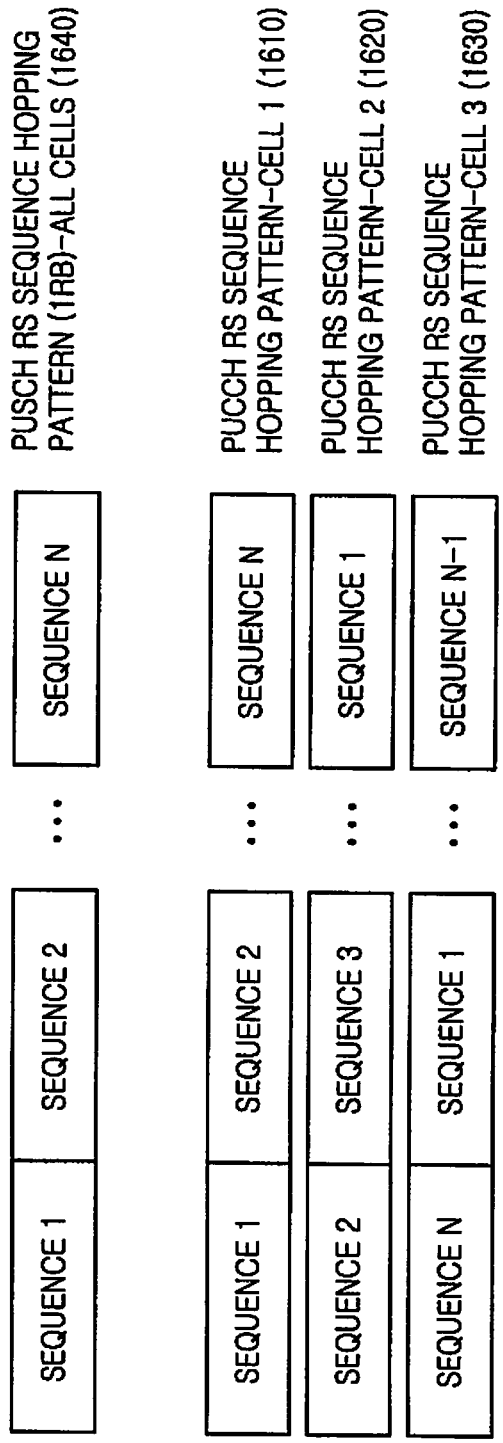
FIG. 16 is a diagram illustrating determining the PUCCH sequence from the PUSCH sequence by applying a shift, according to an embodiment of the present invention.

The above are illustrated in FIG. 16 where in an embodiment, a shift of 0 1610, 1 1620, and −1 1630 is applied to the sequence hopping pattern of the PUCCH transmission in three different cells relative to the sequence hopping pattern for the PUSCH RS transmission 1640. The different sequence hopping patterns simply correspond to a cyclical shift (the addition of the shift value is modulo the sequence set size) of the same sequence hopping pattern 1640, or equivalently, the different sequence hopping patterns correspond to different initialization of the same hopping pattern. The initialization of the hopping pattern for the PUSCH may be explicitly or implicitly signaled, as previously described, and the shift for the initialization pattern for the PUCCH is determined relative to the initial sequence for the PUSCH (which may be different than the first sequence in the set of sequences). The above roles of the PUSCH and PUCCH may be reversed and the shift may instead define the initialization of the PUSCH, instead of the PUCCH, hopping pattern in a cell. The start of the hopping pattern in time may be defined relative to the first slot in the first sub-frame in a frame or a super-frame (both comprising of multiple sub-frames) as these notions are typically referred to in the art.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method for transmitting a signal comprising a reference signal by a user equipment in a communication system, the method comprising:
   receiving, from a base station, information indicating whether sequence hopping is applied or not;
   transmitting, to the base station, the signal using a first sequence if a number of resource blocks allocated to the user equipment is less than a predetermined value; and transmitting, to the base station, the signal using a second sequence to which the sequence hopping is applied based on the received information if the number of the resource blocks allocated to the user equipment is greater than or equal to the predetermined value.

2. The method of claim 1, wherein the sequence hopping is performed using a pseudo-random function.

3. The method of claim 1, wherein the predetermined value is 6.

4. The method of claim 1, wherein the sequence hopping is performed in a unit of a slot on a physical uplink shared channel (PUSCH).

5. The method of claim 1, wherein the sequence comprises a constant amplitude zero auto-correlation (CAZAC)-based sequence.

6. An apparatus for transmitting a signal comprising a reference signal in a communication system, the apparatus comprising:
a transceiver configured to transmit or receive data; and
a controller coupled with the transceiver and configured to:
receive, from a base station, information indicating whether sequence hopping is applied or not,
transmit, to the base station, the signal using a first sequence if a number of resource blocks allocated to the user equipment is less than 6, and
transmit, to the base station, the signal using a second sequence to which the sequence hopping allocated to the user equipment is applied based on the received information if the number of the resource blocks is greater than or equal to 6.

7. The apparatus of claim 6, wherein the sequence hopping is performed using a pseudo-random function.

8. The apparatus of claim 6, wherein the sequence hopping is performed in a unit of a slot on a physical uplink shared channel (PUSCH).

9. The apparatus of claim 6, wherein the first and the second sequences comprise a constant amplitude zero auto-correlation (CAZAC)-based sequence.

10. A method for receiving a signal comprising a reference signal by a base station in a communication system, the method comprising:
transmitting information indicating whether sequence hopping is applied or not; and
receiving, from a user equipment, the signal based on the information and a sequence,
wherein the sequence is determined as a first sequence if a number of resource blocks allocated to the user equipment is less than a predetermined value, and
wherein the sequence is determined as a second sequence to which sequence hopping is applied based on the transmitted information if the number of the resource blocks allocated to the user equipment is greater than or equal to the predetermined value.

11. The method of claim 10, wherein the sequence hopping is performed using a pseudo-random function.

12. The method of claim 10, wherein the predetermined value is 6.

13. The method of claim 10, wherein the sequence hopping is performed in a unit of a slot on a physical uplink shared channel (PUSCH).

14. The method of claim 10, wherein the sequence comprises a constant amplitude zero auto-correlation (CAZAC)-based sequence.

15. An apparatus for transmitting a signal comprising a reference signal in a communication system, the apparatus comprising:
a transceiver configured to transmit or receive data; and
a controller coupled with the transceiver and configured to:
transmit information indicating whether sequence hopping is applied or not, and receive, from a user equipment, the signal based on the information and a sequence,
wherein the sequence is determined as a first sequence if a number of resource blocks allocated to the user equipment is less than a predetermined value, and
wherein the sequence is determined as a second sequence to which sequence hopping is applied based on the transmitted information if the number of the resource blocks allocated to the user equipment is greater than or equal to the predetermined value.

16. The apparatus of claim 15, wherein the sequence hopping is performed using a pseudo-random function.

17. The apparatus of claim 15, wherein the predetermined value is 6.

18. The apparatus of claim 15, wherein the sequence hopping is performed in a unit of a slot on a physical uplink shared channel (PUSCH).

19. The apparatus of claim 15, wherein the first and the second sequences comprise a constant amplitude zero auto-correlation (CAZAC)-based sequence.

* * * * *

UNITED STATES PATENT AND TRADEMARK OFFICE
CERTIFICATE OF CORRECTION

PATENT NO.         : 10,298,367 B2
APPLICATION NO.    : 15/399396
DATED              : May 21, 2019
INVENTOR(S)        : Aris Papasakellariou et al.

Page 1 of 1

It is certified that error appears in the above-identified patent and that said Letters Patent is hereby corrected as shown below:

In the Claims

Column 13, Claim 6, Line 27: "the user equipment" should be corrected to --a user equipment--

Column 14, Claim 10, Line 5: "sequence hopping" should be corrected to --the sequence hopping--

Column 14, Claim 15, Line 32: "sequence hopping" should be corrected to --the sequence hopping--

Column 14, Claim 15, Line 18: "transmitting" should be corrected to --receiving--

Signed and Sealed this
Thirty-first Day of March, 2020

Andrei Iancu
*Director of the United States Patent and Trademark Office*